United States Patent [19]

Wong

[11] 4,271,425

[45] Jun. 2, 1981

[54] ENCAPSULATED ELECTRONIC DEVICES AND ENCAPSULATING COMPOSITIONS HAVING CROWN ETHERS

[75] Inventor: Ching-Ping Wong, Lawrence Township, Mercer County, N.J.

[73] Assignee: Western Electric Company, Inc., New York, N.Y.

[21] Appl. No.: 90,797

[22] Filed: Nov. 2, 1979

[51] Int. Cl.$^3$ .............. C08G 77/04; C08K 5/06; C03C 17/28; C08G 77/38
[52] U.S. Cl. .............. 357/72; 260/30.4 SB; 260/45.8 A; 357/52; 525/474; 528/27; 528/40
[58] Field of Search .......... 260/30.4 SB, 45.8 A; 528/27, 40; 357/72; 525/474

[56] References Cited

U.S. PATENT DOCUMENTS

| | | | |
|---|---|---|---|
| 2,465,296 | 3/1949 | Swiss | 174/121 |
| 3,065,194 | 11/1962 | Nitzsche et al. | 260/37 |
| 3,334,067 | 8/1967 | Weyenberg | 260/46.5 |
| 3,592,795 | 7/1971 | Ashby | 260/46.5 |
| 3,597,268 | 8/1971 | Chang et al. | 357/72 |
| 3,614,550 | 10/1971 | Marinance et al. | 357/72 |
| 3,816,164 | 6/1974 | Pepe et al. | 117/72 |
| 3,900,600 | 8/1975 | Spaulding | 427/99 |
| 3,919,438 | 11/1975 | Urkevich | 427/54 |
| 4,017,495 | 4/1977 | Jaffe et al. | 264/272 |
| 4,048,356 | 9/1977 | Bakos et al. | 427/379 |
| 4,104,275 | 8/1978 | Kauer | 260/297 B |
| 4,123,586 | 10/1978 | Betts et al. | 428/391 |
| 4,138,543 | 2/1979 | Bargain et al. | 528/14 |

OTHER PUBLICATIONS

C.A. 62532p(85) Kruglyak et al., "Electronic Conformational Mechanism of Lithium (+) Ions with 12--Crown 4".
C.A. 192363(d) Pullman et al., "Cation Binding to Crown Ethers".
Hitachikk, "Semiconductor Device . . . Polysiloxane Resin", Derwent Abs. 48777 A/27.
C.A. 88-90806m, "Organosiloxanes", Bargain et al.
C. J. Pedersen, "J. Amer. Chem. Soc." 89 7017 (1967).
R. N. Greene, "18-Crown-6 . . . " Tetrahedron Letters No. 18, pp. 1793-1796 (1972).
Chem. Abs. Mar. 1976, p. 39929q, Kaneda et al., "Semiconductor Sealing Resin Compositions Containing Crown Ethers . . . ".
A. C. Knipe, "Crown Ethers", J. of Chem. Ed. pp. 618-622 (1976).
Derwent 72474 B/40 (J54107-485) "Surface Treatment . . . ".

Primary Examiner—Joseph L. Schofer
Assistant Examiner—Herbert J. Lilling
Attorney, Agent, or Firm—J. F. Spivak

[57] ABSTRACT

An electronic device having a silicone encapsulant includes a 12-crown or 15-crown ether in the encapsulant for preventing migration of sodium or potassium ions.

7 Claims, 3 Drawing Figures

DURING TESTING SETUP

DURING MEASUREMENT SETUP

EFFECT OF CROWN ETHERS IN SILICONE ENCAPSULANTS

ENCAPSULATED ELECTRONIC DEVICES AND ENCAPSULATING COMPOSITIONS HAVING CROWN ETHERS

TECHNICAL FIELD

This invention relates to electronic devices such as semiconductor devices and integrated circuits having silicone encapsulant therefor, and particularly, to electronic devices wherein the silicone encapsulant includes a crown ether for preventing migration of sodium and potassium ions.

BACKGROUND OF THE INVENTION

It is known that sodium and potassium ions along with water vapor are major contaminants of semiconductor materials and devices, especially integrated circuits. These ions tend to migrate through the device material, especially under an applied bias and in the presence of moisture and a halogen environment. When the ions migrate to a p-n junction, they pick up an elctron and become metallic elements and deposit on the p-n junction. Accumulation of these metals at the junction causes the device to short and fail. It is particularly difficult to control the presence of sodium and potassium ions since they are abundant materials in our general living environment. For example, contamination from fingerprints, residual solder fluxes and other processing salts frequently leave a residue of the ions of these alkali metals, in particular sodium.

Various polymeric silicone resins such as RTV silicone elastomer has been used as an encapsulant or sealant material to protect electronic semiconductor devices from mechanical damage and temperature and humidity effects of the environment. However, in the manufacturing processes employing and preparing the silicone materials used in the preparation of the elastomers, trace amounts of sodium or potassium are almost always present. When the encapsulant is employed on the electronic device these ions tend to migrate as mentioned above, causing device failure. Consequently, a way to eliminate these contaminants or reduce their ability to migrate, especially when used as an integrated circuit encapsulant is needed. Since it is not practical to eliminate these ions from the manufacturing process of the silicones, the technique of ion trapping these contaminants has been employed.

It has been known since 1967 that certain macrocyclicpolyethers known as crown ethers can complex alkali metal cations. This was reported by C. J. Pedersen in *J. Amer. Chem. Soc.*, 89, 7017 (1967) and again by R. N. Green in *Tetrahedron Letters*, 18, 1793, (1972). These crown ethers were then used by Kaneda et al. as reported in Chemical Abstracts under the title "Semiconductor Sealing Resin Compositions Containing Crown Ethers or Cryptate Ethers as the Alkali Metal Ion Getters," March 1976 at page 39929q. According to *Chemical Abstracts*, this culminated in Japanese issued Patent No. 76-11377. The particular crown ethers described in that patent, in accordance with *Chemical Abstracts*, are various 18-crown-6 ethers. While these ethers do somewhat restrict the migration of sodium ions in the silicone resin encapsulant, a significant amount of migration is still present.

SUMMARY OF THE INVENTION

An electronic device such as an integrated circuit device comprises a circuit element and an encapsulant therefor wherein the encapsulant comprises a polymeric silicone having a crown ether selected from a 12-crown-4 ether and a 15-crown-5 ether contained there.

DETAILED DESCRIPTION

Figure 1:
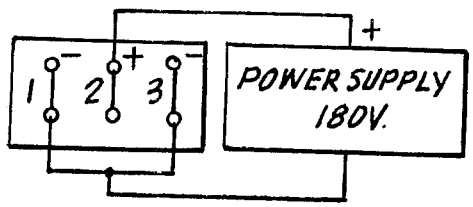
FIGS. 1 an 2 are diagrams depicting the test set up used to evaluate encapsulants.

Polymeric silicones are organic silicone compounds which have been polymerized. It has long been known in the semiconductor art that electronic semiconductor devices may be protected from environmental contamination by encapsulating these devices. Polymeric silicones have been a preferred encapsulant. The basic structural unit of these organic silicone compounds is as follows:

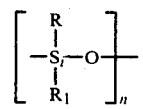

the R and $R_1$ each may be hydrogen, alkyl, alkanyl, aryl, aroxyaryl or other organic radicals, both saturated and unsaturated, or oxygen. A number of the basic organo silicone oxide units are polymerized or condensed through the alternate silicone oxygen linkages to form the polymeric silicones. Organic silicones are readily commercially available and are well known in the art. Further examples of these materials and the preparation thereof can be obtained with reference to the following U.S. Pat. Nos.: 3,919,438; 4,017,495; 3,900,600; 3,816,164; 3,065,194; 3,334,067; 3,592,795; 2,465,296 and the information contained therein should be deemed included herein by reference.

Crown ethers are macrocyclicpolyethers which have been found to be complexing agents for metal ions. The synthesis of these ethers is well known in the art and, for example, can be found with reference to U.S. Pat. No. 4,104,275, an article by A. C. Knipe entitled "Crown Ethers", *Journal of Chemical Education*, 53 (10) 618, (1976), an article by C. J. Pedersen, published in *J. Amer. Chem. Soc.* 89 7017 (1967) and the various references referred to in the above articles.

Generally, the trivial nomenclature for these ethers is preferred for simplicity and shall be used herein. For example, for the compound having the structural formula

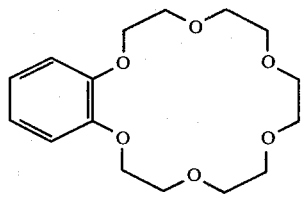

*Chemical Abstracts* names this compound monobenzo-18-crown-6 ether 2,3,5,6,8,9,11,12,14,15-decahydro-1,4,7,10,13,16-benzohexaoxacyclooctadecin. However, in trival terminology this compound may simply be termed benzo 18-crown-6 ether. The numeral antecedent to the crown term defines the number of atoms in the cyclic structure and the numeral subsequent to the crown term indicates the number of oxygen or ethers within that cyclic structure. The prefix, benzo, indicates the presence of a benzene ring pendant to the cyclic structure. It should be understood that the term ether as used herein includes throethers where some or all of the normal oxygen ether bonds are substituted by sulfur.

As previously indicated in Kaneda et al. have reported the use of crown ethers in semiconductor sealing resin compositions to function as alkali metal ion getters. The crown ethers reported by Kaneda are 18-crown-6 ethers. While crown ethers from 9-crown-3 through 30-crown-10, and larger, have been reported, I have found that 12-crown-4 and 15-crown-5 ethers and their derivatives are far superior to other crown ethers for the prevention of migration of sodium and potassium ions in silicone encapsulants for semiconductor devices. The 12-crown-4 ethers and their derivatives are especially suitable for the prevention of migration and trapping of sodium ions. The 12-crown-4 ether has the basic structural formula as follows:

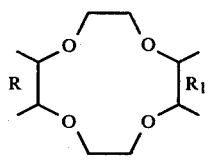

while the 15-crown-5 ether has the basic structural formula:

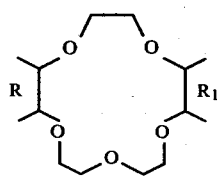

Typical suitable derivatives of these crown ethers are where R and $R_1$ are selected from a cyclic alkyl group e.g. cyclohexyl, methylcyclohexyl or cyclopentyl, an aryl group e.g. benzyl, an alkylaryl group e.g. butylbenzo or hydrogen. The above derivatives are meant to be illustrative only and any 12-crown-4 ether or 15-crown-5 ether derivative is suitable as long as it is soluble in the silicone and does not contain groups which would prevent the trapping of the alkaline metal ion in the cyclic portion of the ether structure.

Figure 2:
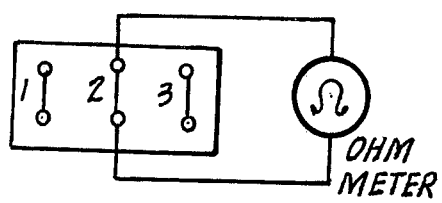

The effectiveness of ion trapping by the crown ethers within a silicone encapsulant was determined by electrical tests on a triple track testing circuit of the type depicted in FIGS. 1 and 2. This triple track testing circuit comprises fine closely spaced lines 11, 12 and 13 of tantalum nitride on an alumina substrate '4. The lines 11, 12 and 13 and spaces therebetween are approximately 3 mils in width. For testing, the test circuits are electrically connected to a power supply and placed in a battery jar within an oven chamber. The circuits which have been coated with the encapsulant to be tested are then exposed to a high temperature (100° C.), high relative humidty (96%) environment and a positive 180 volt bias supplied to the two outer tracks 11 and 13 while the center track 12 is held at ground potential. After applying this bias for a desired period of time the bias is removed and the resistance along the tantalum nitride track is measured by means of an ohmmeter (FIG. 2). Change of resistance of the tantalum nitride is a measure of the degree of electro-oxidation occurring which in turn is a measure of the leakage current use to impurities in the silicone which cause the resistor to anodize. The change of the resistance with respect to the original resistance is, therefore, a measure of the electro-oxidation process which is caused by migrating ions and in particular sodium potassium ions in the silicone resins. The greater the change of resistance with time due to the oxidation process, the greater the degree of migration of the sodium and/or potassium cations in the silicone resins. Consequently, the less the resistance changes with testing time, the better the encapsulant material will be. Comparative tests of various crown ethers in different commercially available RTV elastomer silicone resins were performed.

EXAMPLE I

DC-3145, Dow Corning RTV elastomer, a silicone elastomer of a molecular weight of approximately 40,000 is first dissolved in xylene. Atomic absorption spectroscopy is used to measure the quantity of sodium and potassium in the elastomer. Once determined, an exact stoichiometric amount of the crown ether employed is added to the silicone mixture. In this instant $3.97 \times 10^{-4}$ moles of the respective ethers was added. The mixture is well stirred and coated on the test circuit. The elastomer is then cured at room temperature for about 16 hours and placed in an oven for additional 8 hours at 120° C. At this time, the encapsulant is completely cured and ready for electrical testing as previously described.

EXAMPLE II

The same procedure was followed using Dow Corning DC3-6550 silicone resin at the encapsulant. Here, equal moles of 15-crown-5 ether was added to the resin.

Figure 3:
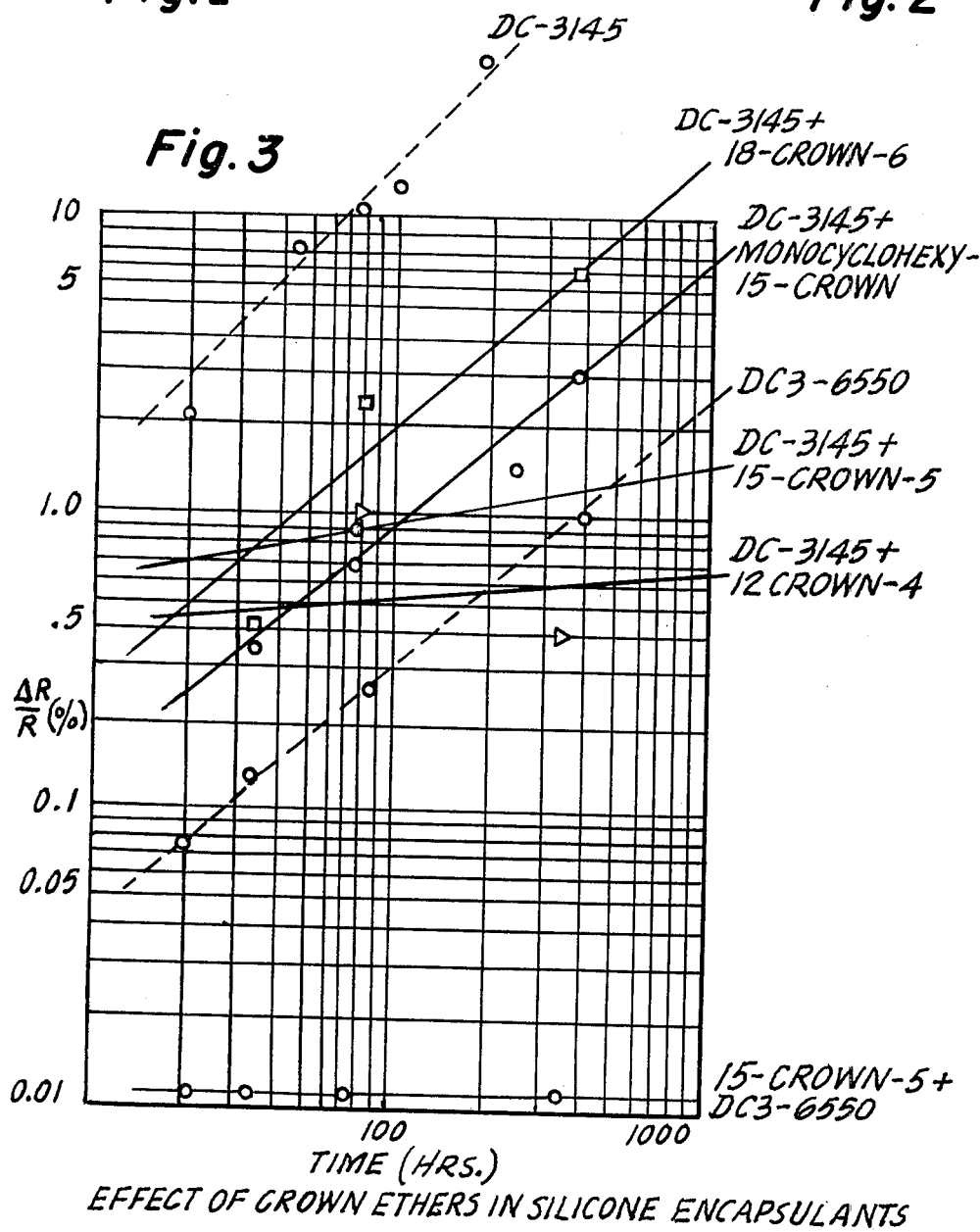
FIG. 3 is a graph representing the test results.

FIG. 3 is a graphical representation of the results of these experiments plotting, the change of resistance (CR) over initial resistance as a function of less time employing the DC-3145 resin and DC3-6550 resin, respectively without any crown ether added and with 12-crown-4, 15-crown-5 and 18-crown-6 ethers added. It can be seen from FIG. 3 that the resins having no ether dope therein have the highest rate of degradation (highest slope) due to ion migration. It can also be seen that while the addition of 18-crown-6 ether improves the resin by decreasing both the rate of degradation and the absolute resistance of the tracks, the rate of degradation is still substantial. It can further be seen that the addition of 15-crown-5 ether and more particularly 12-crown-4 ether to the DC-3145 Dow Corning resin substantially improves the resistance to degradation due to alkali metal ion migration. These resins result in amost a very small slope or very small degree of degradation condition with time under the bias, relative humidity and heating conditions employed. Similarly, in accordance with FIG. 3, it can be seen that the degradation of the DC3-6550 resin is completely eliminated under the experimental conditions by the addition of the 15-crown-5 ether. The same results would be expected with the 12-crown-4 ether.

It should be noted that while the results described herein are limited to the 12-crown-4 and 15-crown-5 ether doping of silicone resins, this as the preferred embodiment, other resins wherein these ethers are soluble may be employed.

What is claimed is:

1. An electronic device comprising a circuit element, and an encapsulant therefor wherein said encapsulant is a polymeric material having dissolved therein a crown ether selected from the group consisting of a 12-crown-4 ether, a 15-crown-5 ether and derivatives thereof.

2. The electronic device recited in claim 1 wherein the polymeric material is polymeric silicone.

3. The device recited in claim 2 wherein the crown ethers is 12-crown-4 ether.

4. The device recited in claim 2 wherein the crown ether is 15-crown-5 ether.

5. The device recited in any of claims 1, 2, 3 or 4 wherein the crown ether is added to the polymer in at least a stoichiometric molar quantity to the number of moles of alkali metal ion impurity in the polymer.

6. A composition of matter comprising a polymeric elastomer having dissolved therein a crown ether selected from the group consisting of a 12-crown-4 ether, a 15-crown-5 ether and derivitives thereof.

7. The composition recited in claim 6 wherein the polymeric elastomer is a polymeric silicone resin and wherein the crown ether is present therein in at least a stoichiometric molar quantity as compared to the molar quantity of alkali metal ion impurity in said resin.

* * * * *